US007437155B2

(12) United States Patent
Levitan

(10) Patent No.: US 7,437,155 B2
(45) Date of Patent: Oct. 14, 2008

(54) SYSTEM AND METHOD FOR OPERATING A PRIVATE WIRELESS COMMUNICATIONS SYSTEM

(75) Inventor: Benjamin C. Levitan, Raleigh, NC (US)

(73) Assignee: Nextel Communications Inc., Reston, VA (US)

( * ) Notice: Subject to any disclaimer, the term of this patent is extended or adjusted under 35 U.S.C. 154(b) by 0 days.

(21) Appl. No.: 11/176,890

(22) Filed: Jul. 6, 2005

(65) Prior Publication Data

US 2007/0010245 A1 Jan. 11, 2007

(51) Int. Cl.
*H04Q 7/20* (2006.01)

(52) U.S. Cl. .................... 455/433; 455/405; 455/432.1

(58) Field of Classification Search ................ 455/405, 455/441.1-441.4, 432.1, 433

See application file for complete search history.

(56) References Cited

U.S. PATENT DOCUMENTS 6,907,242 B2 * 6/2005 Thakker ................. 455/432.1
2006/0047633 A1 * 3/2006 Fontana et al. ................. 707/3
2006/0160565 A1 * 7/2006 Singh et al. .............. 455/554.1
2006/0199580 A1 * 9/2006 Zhang ...................... 455/432.1
2006/0223530 A1 * 10/2006 Bumiller .................. 455/435.1

* cited by examiner

*Primary Examiner*—Vincent P. Harper
*Assistant Examiner*—Eric Elcenko

(57) ABSTRACT

A private communications system includes a base station, a switch and an interface to an external network. The base station provides a radio link between the private communications system and a subscriber unit. The subscriber unit has an associated mini-subscription providing the subscriber unit with temporary access to the private communications system. The switch is connected to the base station and provides the subscriber unit with access to the private communications system when the mini-subscription is active. The interface is connected to the switch. In operation, the mini-subscription information is automatically transmitted to the external wireless network, via the interface, when the mini-subscription is terminated.

21 Claims, 7 Drawing Sheets

SYSTEM AND METHOD FOR OPERATING A PRIVATE WIRELESS COMMUNICATIONS SYSTEM

FIELD OF THE INVENTION

The present invention relates generally to private wireless communications systems and more particularly to systems and methods for providing temporary access to a private wireless communications system.

BACKGROUND OF THE INVENTION

Many businesses, universities and other enterprises maintain control over their telephone services through the use of private branch exchanges (PBXs). A PBX typically routes internal enterprise telephone calls to a target phone and external telephone calls to the public switched telephone network (PSTN). Using a PBX, the enterprise may assign telephone numbers and facilitate abbreviated dialing to internal and external numbers by dialing extensions. Decision trees within the PBX enable the enterprise to control communications costs in external routing decisions and enable the enterprise to make use of a small fraction of the telephone lines that would be required to provide each internal phone with a dedicated phone circuit.

A PBX does not always meet the communications needs of the enterprise or its customers. In environments that attract a large number of temporary users such as hotels, resorts, theme parks, sporting events and concert facilities, guests often use external communications systems that may be available, such as mobile phones, walkie-talkies, email devices and public pay phones. When external communications system are used, the enterprise has no control over the quality of service or the costs incurred by its guests, and the enterprise loses a potential source of revenue.

On a cruise ship, for example, telephone services are typically offered in each passenger cabin via a wireline phone connected to a PBX. A passenger may call other passenger cabins, ship services or, via a satellite link when at sea, an external phone system such as a PSTN. Satellite calls are expensive, leading many cruise passengers to avoid calling from the cruise ship and, instead, use local payphones when the cruise ship is docked. Payphones are usually less expensive than the ship's satellite calls, but are risky and inconvenient. People who "shoulder surf" or use other fraudulent methods, such as fake telephones, to steal the passenger's card numbers may victimize passengers using credit cards or calling cards. When payphones are used, calls are limited to the times and places that payphones are available, and the cruise ship operators have no control over the quality of service or the costs incurred by its passengers.

Communication between passengers is also limited on a cruise ship. The passenger cabins are typically small, and passengers spend much of their time outside of their cabins visiting destination ports and enjoying the ship's amenities, such as swimming pools, formal dining facilities, movie theaters, health spas and gambling casinos. It is common for cruise passengers to bring walkie-talkies to communicate with other passengers while on the ship or at a destination port. Walkie-talkies work best in large common areas such as the deck of the ship or in a dining room, and do not work well, if at all, between different levels of the ship or different ends of the ship when the radio signals are obstructed. Walkie-talkies have a limited range with a clear line-of-sight, and the range is much shorter when obstructions are in the way. Because of these limitations, walkie-talkies are also not effective at destination ports, such as an island, where passengers disperse while visiting local sites.

Another drawback is that walkie-talkie channels are not private, and conversations may be shared with others who are using the same frequency due to the limited number of frequencies assigned to Family Radio Service (FRS) devices. Cruise ships vary in size with large ships carrying over 3,000 passengers and while at a destination port, the number of tourists, crew members and locals is much larger. In some implementations, a walkie-talkie user has the option to select from multiple channels to increase the chance of finding a clear communications channel. Even then the user must often sort through communications among other passengers using the selected channel to determine whether a communication is directed to the user. Conversations are often strained with cross talk, interference from other passengers and poor reception.

Many passengers carry their own mobile phones, which may provide phone access when the cruise ship travels within range of a compatible wireless communications network. Wireless service availability is often intermittent, unreliable, incompatible and potentially very expensive in foreign ports. Because the user is roaming away from its home network, roaming rates for using an available wireless service may be predatory for both the calling and called parties, often resulting in charges for two international calls when calling locally. Further, a caller can only call another passenger who also has a phone that is compatible with an available wireless network.

In view of the above, there is a need in the art for a wireless communications system that is adaptable to meet the temporary communications needs of an enterprise and its guests. There is a further need for a communications system that provides a private enterprise with control over the costs and quality of service of the wireless communications services used by its guests.

SUMMARY OF THE INVENTION

The present invention is a system and method for operating a private wireless communications system. In one embodiment, a method for providing wireless services includes provisioning a subscriber unit for use on a first wireless network, the subscriber unit having an associated mini-subscription defining a limited use of the first wireless network, terminating the mini-subscription on the first wireless network, and automatically transferring the mini-subscription to a second wireless network.

In another embodiment, a private communications system includes a base station, a switch and an interface to an external network. The base station provides a radio link between the private communications system and a subscriber unit. The subscriber unit has an associated mini-subscription providing the subscriber unit with temporary access to the private communications system. The switch is connected to the base station and provides the subscriber unit with access to the private communications system when the mini-subscription is active. The mini-subscription information may be automatically transmitted to the external wireless network, via the interface, when the mini-subscription is terminated.

In another embodiment, a method of operating a wireless communications system on a vessel having a plurality of passenger cabins includes provisioning a subscriber unit on the wireless communications system, the subscriber unit having a mobile station identifier and an extension associated with a passenger cabin, receiving at a mobile switching center an incoming communication directed to the passenger cabin, and establishing a wireless communication link between the subscriber unit and the mobile switching center.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
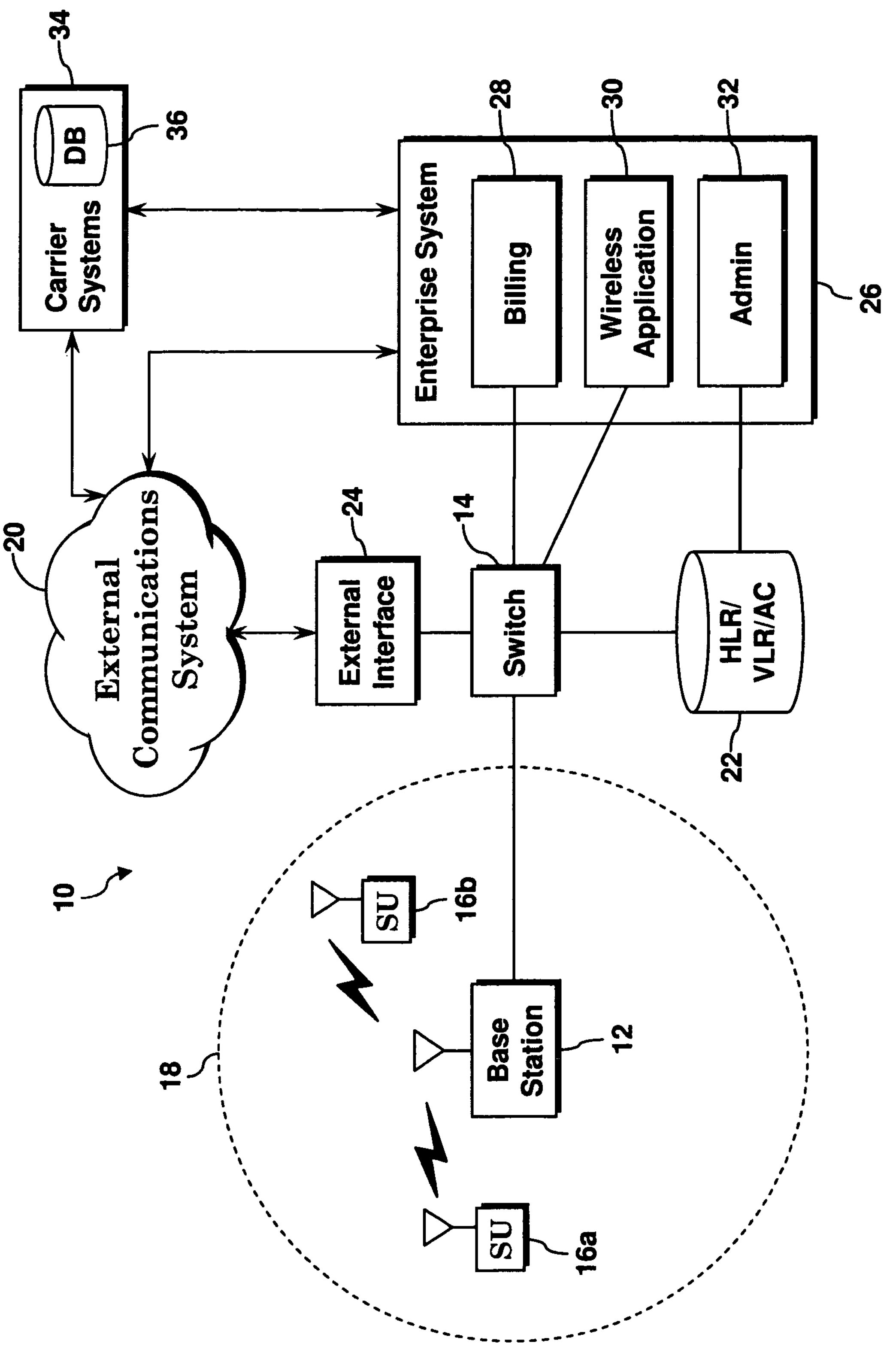
FIG. 1 illustrates a communications system in accordance with an embodiment of the present invention.

An embodiment of the present invention will now be described with reference to FIG. 1. A communications system 10 includes a base station 12 and a switch 14. The base station 12 provides wireless communications services to at least one subscriber unit 16*a* that is within a coverage area 18 of the base station 12. In the exemplary embodiment, the base station 12 is an Enhanced Based Transceiver System (EBTS) and the communications system 10 is an iDEN network. In alternate embodiments, the base station 12 may support other multiple-access wireless communications protocols, such as code division multiple access (CDMA), wideband CMDA (WCDMA), Advanced Mobile Phone Service (AMPS), Global System for Mobile Communications (GSM), General Packet Radio Services (GPRS), High Data Rate (HDR) technology, Push-to-Talk over Cellular (PoC) or voice and data services provided over a broadband network such as WiFi, WiMax, any 802 protocol or similar system. The subscriber unit 16*a* may be any device that is adapted for communication with the base station 12 such as a mobile station, pager, personal digital assistant (PDA), a Personal Computer Memory Card International Association (PCMCIA) card, or portable computer. The communications system 10 supports at least one mode of communication such as interconnect, dispatch, email, short messaging service (SMS), multimedia messaging service (MMS) and packet data communications.

The switch 14 is connected to the base station 12 and manages communications within the coverage area 18 including routing communications between the subscriber unit 16*a* and another subscriber unit 16*b*, and routing communications between the subscriber unit 16*a* and an external communications system 20, such as a public switched telephone network (PSTN), public switch data network (PSDN), the Internet or another wireless communications system. The switch 14 also manages registration, authentication and location updating of the subscriber units 16*a* and 16*b*. It will be appreciated that the communications system 10 may include a plurality of base stations and switches and support any number of subscriber units.

The switch 14 is connected to a database 22, which includes a home location register (HLR) storing subscriber information for the communications system 10, and a visitor location register (VLR) storing information for subscriber units roaming on the communications system 10. The database 22 may also include an Authentication Center (AC) for use in authenticating subscribers. The switch is connected to the external communications system 20 through an external interface 24.

The communications system 10 may be installed as a private wireless network for an enterprise such as a cruise ship, hotel, resort, concert facility or sports venue. Enterprise system 26 is connected to the switch 14 and in the exemplary embodiment includes a billing system 28, a wireless application server 30 and an administration system 32. The enterprise system 26 may also be connected to external communications systems 20, such as the Internet. The billing system 28 processes call detail records (CDR) received from the switch 14 and allows the enterprise to bill subscriber accounts associated with the subscriber units 16*a* and 16*b* for use of the communication system 10. The billing system may be combined with, or interfaced with, an enterprise billing system to provide users with a single bill.

The wireless application server 30 provides enterprise-related applications to the subscriber units 16*a* and 16*b*. The administration system 32 includes applications for provisioning the subscriber units 16*a* and 16*b* for use of the communications system 10, setting up customer accounts, managing groups for group calls and other administrative functions specific to the enterprise. The enterprise system 26 may also be connected to a carrier system 34 including a database 36 accessed by resellers and retail outlets for entering new subscriber information for the carrier. It should be appreciated that the system may connect to multiple carriers allowing the enterprise to serve as a reseller to each carrier. Through this connection, the enterprise system 26 and carrier system 34 may exchange subscriber information as described herein.

Figure 2:
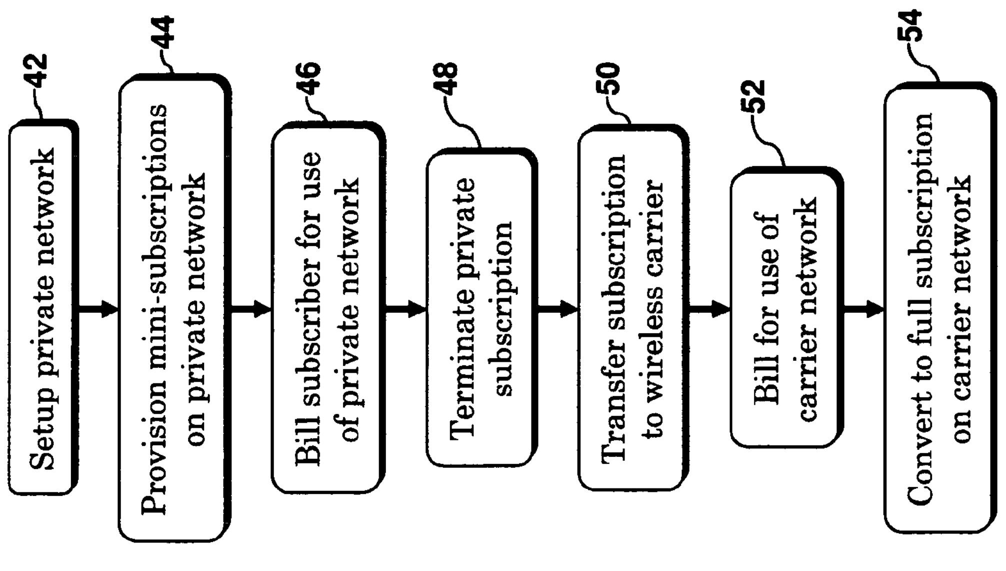
FIG. 2 is a flow diagram illustrating an embodiment of a process for implementing mini-subscriptions.

The enterprise system 26 facilitates temporary subscriptions (referred herein as "mini-subscriptions") providing subscriber units 16*a* and 16*b* with temporary access to the communications system 10. Referring to FIG. 2, an embodiment of a process for implementing mini-subscriptions will now be described. A business relationship (as a reseller) may be established between the enterprise and a wireless carrier. In step 42, a private wireless network, which may be compatible with the wireless carrier, is established for the enterprise. In one embodiment, the wireless carrier provides equipment for the private wireless network, and enterprise guests access the private network using wireless devices compatible with the wireless carrier. Enterprise guests are given an opportunity to try out the wireless carrier's equipment for a limited time and subscribe to the carrier's wireless network in their home market if desired. The relationship between the wireless carrier and private enterprise may provide for revenue sharing, equipment maintenance and the sharing of subscriber information.

The private wireless network may include equipment commonly found in a wireless carrier's cellular on wheels (COW) configuration. A COW is a small cellular switch often used by wireless carriers in emergency situations to add capacity to a wireless communications system when existing phone service goes down. COWs may be transported to an area in need of wireless coverage and quickly setup to establish communications.

In step 44, the subscriber unit is provisioned on the private wireless network with a mini-subscription, and the use of the private wireless network is billed by the private enterprise in step 46. In one embodiment, provisioning a subscriber unit includes obtaining subscriber billing information and configuring the subscriber unit, such as through a subscriber identity module (SIM) card, for use with the private wireless network. Alternatively, a flat rate fee may be included in the charges to the subscriber for use of the enterprise, or the costs of the private wireless network may be applied to the overhead incurred by the private enterprise, thereby avoiding the issue of billing altogether.

Existing subscriber's of the wireless carrier, and other guests with compatible equipment, may elect to bring their own subscriber units. Existing subscriber information may be transferred from the wireless carrier to the enterprise systems via a network connection. The enterprise system then establishes a mini-subscription allowing the subscriber unit to communicate with other subscribers using a private numbering plan associated with the enterprise. When provisioned, the enterprise may enable a special temporary rate plan for existing carrier subscribers, allowing the subscriber unit to access the private wireless communications system without incurring roaming charges.

The home carrier may be configured to route calls targeted to existing subscribers to the private network, such as to the Internet for delivery via VoIP, reject the call or route the call to the subscriber's voicemail on the carrier network. With call forwarding the passenger may be charged for incoming calls according to the home carrier's rate plan. The subscriber may select handling options for incoming calls when the mini-subscription is provisioned, or may modify default selections at a subsequent time, including accepting the call, rejecting the call or routing the call to voicemail. Call screening options may include forwarding calls that meet a listed caller id, forwarding all incoming calls to voicemail, and forwarding calls if the cost of the incoming call meets a certain threshold. For example, if the private network is on a ship where satellite calls are expensive, the subscriber may reject all incoming calls received from a satellite to limit phone charges.

In alternate embodiments, the subscriber unit may be temporarily homed at carrier affiliated with the private enterprise, or the subscriber unit may "roam" on the private network in accordance with a roaming relationship between the enterprise and the home carrier. Various pricing plans may be established between the enterprise system and the home carrier network. An existing subscriber may also be assigned a new subscriber unit for use of the private network. The existing subscriber may elect to have calls to its existing cellular number forwarded to the new subscriber unit via the private network. For example, the private network switch may transmit a message to the subscriber home network indicating that the subscriber is registered on the private network.

The mini-subscription on the private network terminates in step 48. In one embodiment, the mini-subscription terminates when the subscriber's visit to the enterprise ends and use of the private network is no longer desired. The subscriber may keep the subscriber unit and continue using wireless services available through the wireless carrier, or return the subscriber unit to the private enterprise. If the subscriber keeps the subscriber unit, then in step 50 the mini-subscription is transferred to a wireless carrier, establishing a new home system and carrier for the subscriber unit. The enterprise could give the subscriber the option of selecting among several wireless carriers in the subscriber's home market. If the subscriber unit is incompatible with a selected wireless carrier, the enterprise may provide subscription information on an electronic medium, such as a SIM or UIM card which may be inserted into a compatible mobile device.

The subscription on the wireless carrier may be of a short duration (e.g., two weeks) to provide the subscriber with the opportunity to try the carrier's services. The subscriber is billed by the wireless carrier for the limited use of the wireless carrier network in step 52. In one embodiment, the subscription on the wireless carrier is a prepaid subscription that may be replenished by the subscriber. For existing subscribers, the charges for use of the private network may be transferred to their current subscription on their home carrier network after the enterprise relationship ends. The subscriber may return the subscriber unit after a period of use to terminate service, or convert to a full subscription in step 54.

The use of a mini-subscription provides many advantages to both the private enterprise and the wireless carrier. For example, the wireless carrier may offer discount rates for the full subscription, using the private network as a try-and-buy promotion to attract new customers. The private network will have confirmed the financial responsibility of each subscriber through the mini-subscription, providing the wireless carrier with high quality customers. In mobile environments, such as on a cruise ship, the use of mini-subscriptions may facilitate roaming agreements with third party carriers who may otherwise be reluctant to provide services to a roaming customer with an unknown financial history.

The private enterprise may be configured to perform the conversion to a full subscription on the wireless carrier's network at the subscriber's request. The private enterprise maintains mini-subscription information for provisioning the subscriber on the private wireless network, which may be sufficient to establish a subscription on the wireless carrier's network, though the wireless carrier may require the private network to collect some additional information from the subscriber. The private enterprise forwards full subscription information to the wireless carrier to initiate a full subscription for the subscriber.

Figure 3:
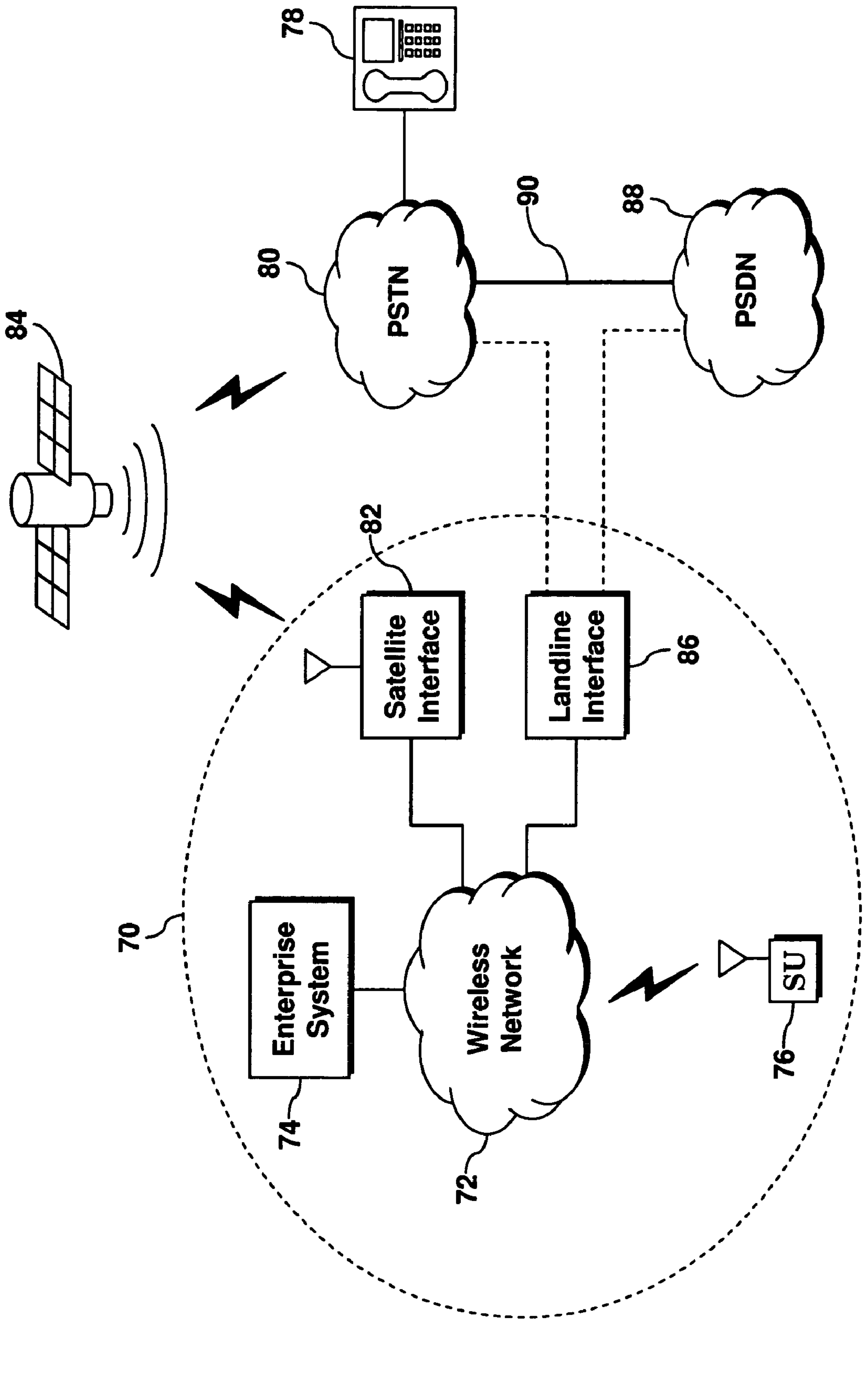
FIG. 3 illustrates an embodiment of a wireless communications system for a cruise ship.

An embodiment of a communications system for a cruise ship will now be described with reference to FIGS. 3 through 10. In FIG. 3, a communications system 70 is installed on a cruise ship and includes a wireless network 72 and an enterprise system 74. The wireless network 72 provides wireless communications to at least one subscriber unit 76. Through the wireless network 72, the subscriber unit 76 may communicate with other subscriber units serviced by the wireless network, and communicate with devices on external networks, such as telephone 78 connected to a PSTN 80. When the cruise ship is at sea, the wireless network 72 directs external communications to a satellite interface 82, which communicates with the PSTN 80 through a satellite 84. When the cruise ship is at a port, a landline interface 86 connects to a local network providing access to the PSTN 80, and external communications may then be routed through the landline connection. It should be appreciated that the landline interface 86 can be connected to a PSTN, to a PSTN via voice-over-IP (VoIP), or to another available connection that provides communications to end users. For example, the landline interface 86 may be connected to a public switched data network (PSDN) 88 facilitating VoIP services. The PSDN 88 is adapted to route calls through the PSTN 80 through a connection 90, that may include a media gateway. By connecting to a VoIP network, communications via the VoIP network will automatically reroute to the ship when the landline interface 86 is connected at each port.

Figure 4:
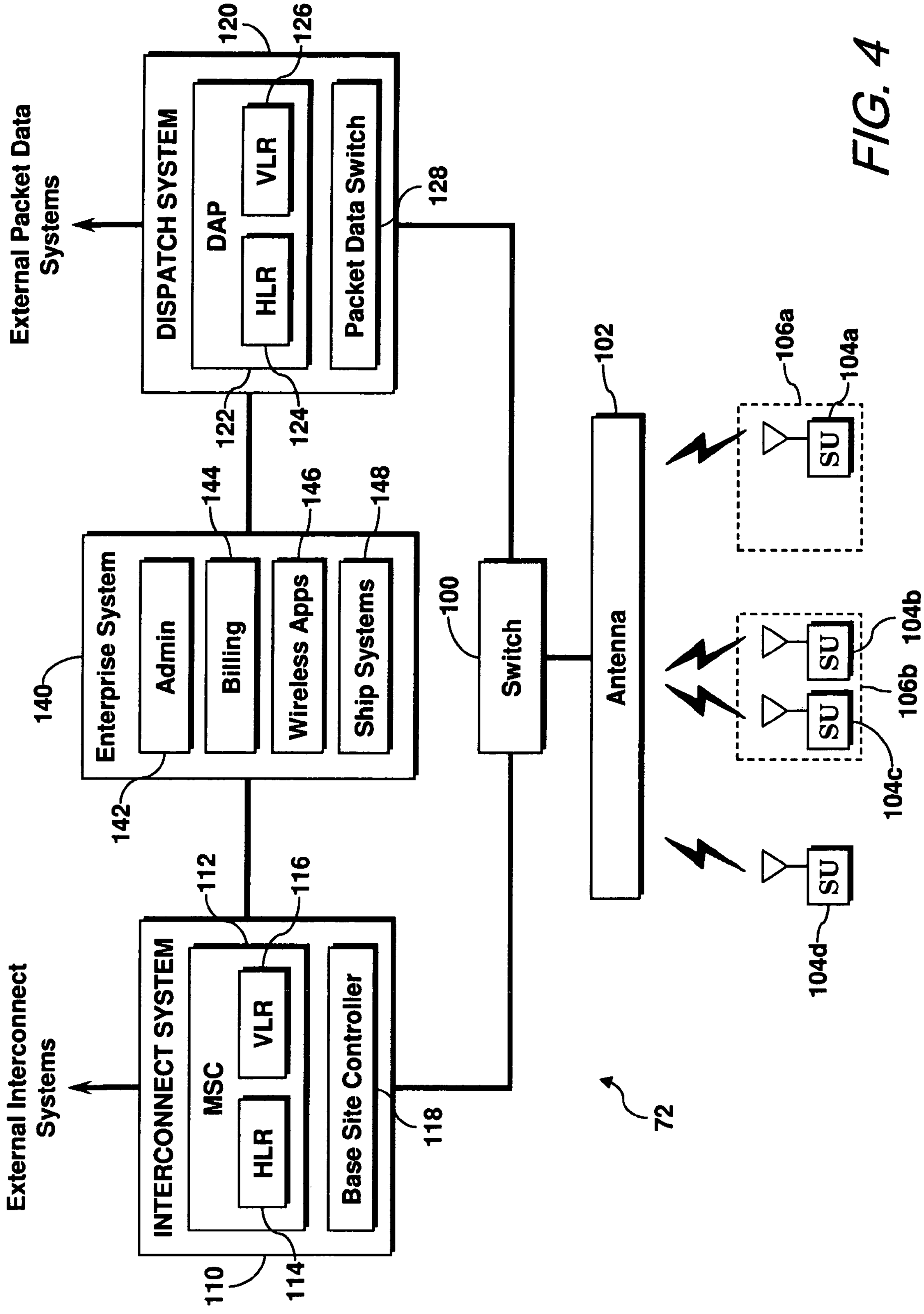
FIG. 4 illustrates an embodiment of a wireless communications system for a cruise ship.

Referring to FIG. 4, the components of the wireless network 72 will be described in greater detail. The wireless network 72 includes a switch 100 connected to at least one antenna 102 providing a radio link to a plurality of subscriber units, such as subscriber units 104*a-d*. The antenna 102 provides radio coverage in passenger cabins 106*a-b* and common areas outside of the passenger cabins. The wireless network 72 further includes an interconnect system 110 and a dispatch system 120. Interconnect calls are routed through the interconnect system 110, which includes a mobile switching center (MSC) 112 and a base site controller 118. The MSC 112 includes a home location register (HLR) 114 and a visitor location register (VLR) 116. The interconnect system 110 is interfaced to an external interconnect system such as a satellite system, landline system or other wireless communications network.

Dispatch (or push-to-talk) calls are routed through the switch system 120, which includes a dispatch application processor (DAP) 122 and a packet data switch 128. The DAP 122 includes an HLR 124 and a VLR 126, which may be implemented in the same database as HLR 114 and VLR 116. The dispatch system 120 is interfaced to an external dispatch system such as a packet switched network or other wireless communications network providing compatible services.

It will be appreciated that the wireless communications system may accommodate other wireless communications technologies, alone or in combination. In one embodiment, the wireless communications system facilitates push-to-talk services via Push-to-Talk Over Cellular (PoC) equipment, including a PoC server and Authentication, Authorization and Accounting (AAA) and Home Subscriber Server (HSS) databases as known in the art. SMS, MMS, email, Internet web browsing and other wireless communications may also be supported by the wireless network 72.

The wireless communications system is also connected to local ship systems 140 including an administration system 142 for managing the wireless communications system and a billing system 144 that tracks calls that are processed through the interconnect systems 110 and dispatch systems 120. Wireless applications 146 interface the wireless communications system with the ship's services. Local systems also include the cruise ship's computer systems 148 such as the ship's customer information and billing systems.

Figure 5:
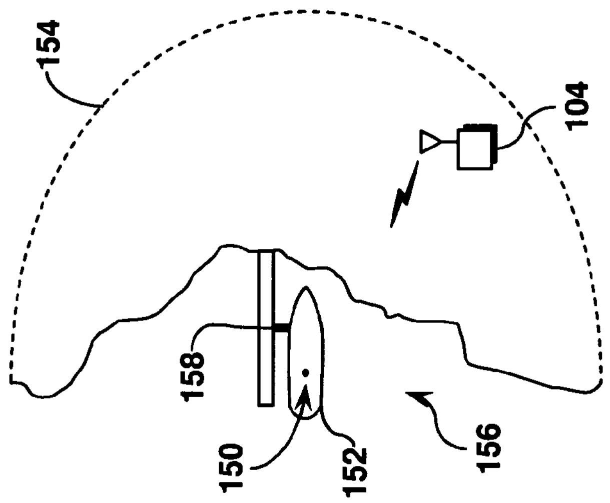
FIG. 5 illustrates an embodiment of a wireless communications system for a cruise ship when docked at a port.

On the cruise ship, the antenna 102 may include a plurality of antennas that are distributed to provide wireless services to the subscriber units 104*a-d* through designated portions of the passenger areas of the cruise ship, including passenger cabins 106*a-b* and common areas, as well as on shore when the ship is docked. Referring to FIG. 5, an antenna 150 is connected to the wireless communications system and is positioned to extend from the top of the ship 152. The antenna 150 provides wireless coverage on the deck of the ship and adjacent locations, and has a wireless coverage area 154 that extends beyond the ship 152.

When the ship 152 pulls into a port 156, subscriber unit 104 may access the wireless communications system while away from the ship, such as on land within the coverage area 154 of the ship 152. On small islands, the antenna 150 may provide wireless coverage for the entire island. When docked, the ship 152 may connect to a local communications network, such as a VoIP network, PSTN or T1 data line, through a landline interface 158. Subscriber units on shore may use the available wireless services, such as push-to-talk, cellular mobile service, SMS and MMS, to communicate with other subscriber units, and communicate with devices on an external network via the landline interface 158.

In one embodiment, the cruise ship is used as a platform for providing local phone service to subscribers when they are at a cruise destination. Subscribers may communicate with other subscribers using the ship's wireless communications system so there will be no roaming charges. The ship's interface with a local PSTN may be used to provide the subscribers with local calling rates to phones in the area. The landline interface 158 may also include a data line or VoIP connection through the Internet through which long distance communications may be facilitated at a reduced or local rate. In an alternate embodiment, the wireless network is adapted to join existing, compatible, wireless communication systems at the port. For example, an iDEN wireless network on a ship may join a local iDEN network as a new base station, providing subscribers with additional local services through the local wireless network.

Figure 6:
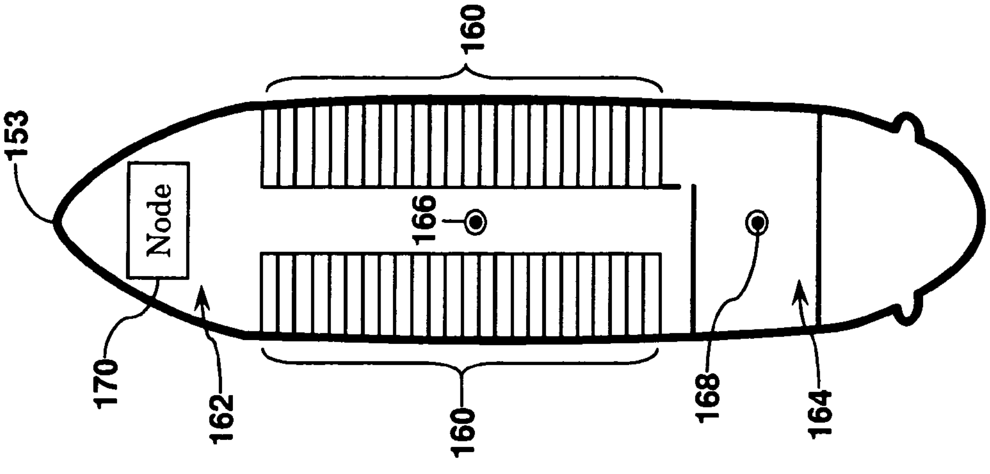
FIG. 6 illustrates an embodiment of a distributed antenna system in a wireless communications system for a cruise ship.

The wireless communications system may include additional antennas, as needed, to provide wireless coverage through designated passenger areas of the cruise ship, distribute network traffic and provide a fail-safe mechanism should an antenna go down. Referring to FIG. 6, an exemplary level 153 of a cruise ship is illustrated. The level 153 includes a plurality of passenger cabins 160, a common area 162 and a dining room 164. An antenna 166 is mounted to provide wireless coverage through the level, including the passenger cabins 160 and the common area 162. A second antenna 168 is mounted in the dining area 164 for additional coverage and capacity. As the subscriber units move through the ship, hand off between antennas is handled by the switch.

The switch can determine the location of a subscriber unit on the wireless network by tracking its servicing antenna, which allows for location-based services. For example, a broadcast message may be sent to all subscriber units in the dining room 164 of the ship by sending the message only to subscriber units connected to the wireless network through antenna 168. In another embodiment, the subscriber unit may be adapted to display a map of the ship 152 and show the location of the subscriber unit 152, location of nearby facilities (e.g., closest restrooms) and location of other subscriber units. The location-based services may facilitate emergency ("911") calling services allowing the ship's personnel to locate a caller within the ship. In another embodiment, a parent can use location-based services to track children, providing an alarm to the parent or ship personnel if the child with a subscriber unit leaves a designated area, or tries to leave the ship.

The wireless network also includes at least one network node 170, such as a computer station or kiosk. Nodes may be placed throughout the ship for use by crew and passengers and may be connected to the wireless network through a wired or wireless connection. In one embodiment, the node 170 is a kiosk for use by subscribers to update group definitions for dispatch calls, view billing information, change a subscriber unit configuration and manage a customer account. Parents may use the kiosk to view the current location of children or friends when permitted by mutual agreement.

When the ship enters a port, the use of the wireless communications system may interfere with local wireless systems. There may also be usage and licensing restrictions relating to certain communication frequencies. In one embodiment, the subscriber units and base stations of the wireless communications system are frequency agile, or multi-band, to enable the system to change frequency bands where there may be a conflict or roaming agreements have not been established. In another embodiment, a plurality of fixed frequency base stations, each having a set of operating frequencies, may be deployed to cover a plurality of frequency of bands.

Operating frequencies for the wireless network may be selected for compatibility with partner wireless carriers, as well as compatibility with local systems at anticipated cruise destinations. A frequency band may be compatible with a cruise destination if it avoids interference with local wireless networks, it is licensed by local authorities for the ship's use, an agreement is reached with a local carrier with rights to the frequency band, it is authorized to join an existing wireless network, or other factors exist that would permit use of the frequency band. Any combination of frequencies could be used, such as 400 Mhz and 800 Mhz in a dual-mode embodiment.

Figure 7:
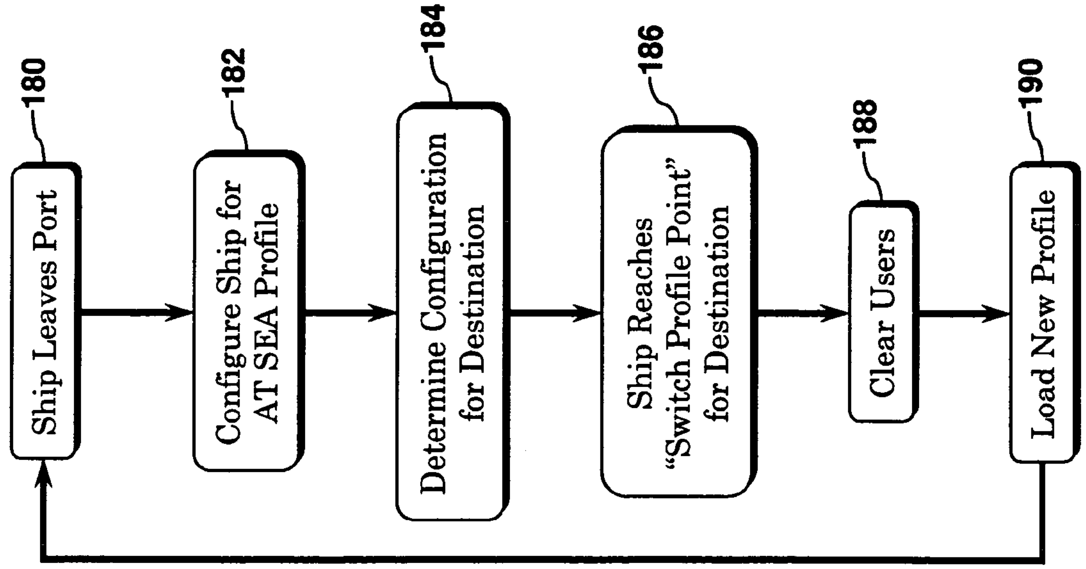
FIG. 7 illustrates an embodiment of a process for operating a frequency-agile portable wireless communications system.

An embodiment of a process for operating a frequency agile wireless communications system is illustrated in FIG. 7. When the ship is docked at a first port, the wireless communications system is configured with a set of operating parameters, including a frequency band and power level, compatible with the first port. In step 180, the ship leaves the first port and travels out of range of wireless communications systems operating at the first port. In step 182, the wireless communications system is configured to operate using an "AT SEA" profile. While the ship is at sea, any frequency may be used without interference and an appropriate operating frequency and power level may be selected based on criteria such as capacity, signal strength and power consumption. If the ship's route does not take it out of range of other wireless networks, the wireless communications system is configured to minimize or avoid local interference along the route.

In step 184, the ship's wireless network determines the destination profile which may include a power level, frequency of operation and the point in the approach to the destination at which the destination profile will be loaded. Preferred operating parameters for each destination port to be visited by the ship may be stored in a database, and the compatible destination profile determined by a database lookup.

The ship reaches the destination's switch profile point in step 186, after which the wireless communications system begins switching to the destination profile. If the current frequency band is compatible with the destination, then no frequency switching is required. If the current frequency band is incompatible with the destination, the base stations in the wireless network will be switched to the destination frequency band. Base stations without active communications may be switched over immediately to the destination frequency band. Subscriber units being serviced by these base stations will rescan and reregister with the base station at the destination frequency band.

In step 188, base stations with active communications will be cleared of active communications before changing frequency bands to avoid dropping the active communications sessions. A base station may be cleared by preventing new communications on the base station, waiting for current connections to drop off, and by forcing a handoff of a communication to other base stations operating on the current frequency band. A handoff may be forced by a base station by gradually reducing power and when the power reaches a threshold set for handoff measurement, each of the subscriber units currently on that base station will handoff to another available base station that is broadcasting a stronger signal.

When a base station has cleared off all subscriber units, it will switch to the destination profile in step 190 and start operating in accordance with the destination profile. When the ship arrives in the destination port, the wireless communications system will be operating on a frequency and at a power level that is compatible with the destination port. Control returns to step 180 when the ship leaves the destination port for the selection of a new configuration profile.

In addition to frequency switching, the ship's wireless network is also adapted to operate at multiple power levels. In some ports, a compatible frequency band may not be available, in which case the wireless network may operate at a reduced power level to allows the ship to continue offering wireless services to subscriber units on the ship without interfering with local networks. In one embodiment, the wireless network operates in at least four coverage modes. While at sea, the wireless network operates in a "sufficient coverage" mode, in which, to reduce power consumption, the coverage area of each base station is reduced to provide sufficient coverage throughout the ship. While docked, the wireless network may operate in "extended coverage" mode, in which power is increased to provide wireless coverage across the maximum allowable geographic area for the port (e.g., an entire island if permitted). Operating at a higher power can also provide passengers with a stronger signal to reduce the chance that a subscriber unit will inadvertently roam onto an expensive local system. If the ship is not permitted to provide wireless coverage on land, the wireless network may operate in "limited coverage" mode, in which the coverage area is limited to the ship and adjacent areas, such as the dock and portions of the beach. If the ship is forbidden from broadcasting outside of the ship, then the wireless network operates in "limited to ship" mode, in which power is reduced to provide coverage only on the ship, such as inside passenger cabins.

Figure 8:
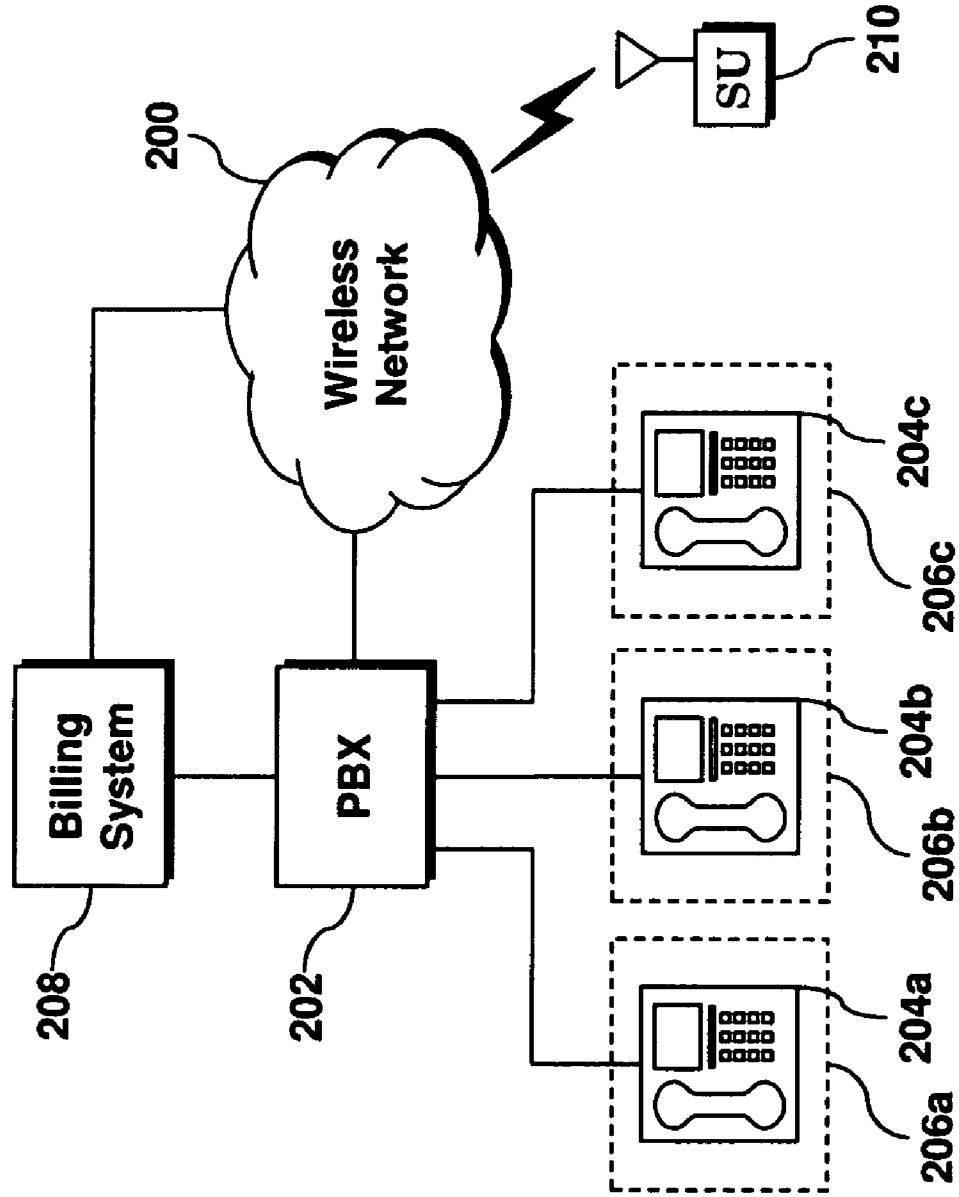
FIG. 8 illustrates an embodiment of a wireless communications system interfaced with a PBX.

An alternative embodiment of a private wireless communications system is illustrated in FIG. 8. A wireless communications system 200 is connected to a PBX 202 and is adapted to route external calls to the PBX 202. The PBX 202 is connected to a plurality of wireline phones 204*a-c*, each having an associated location 206*a-c*, such as a passenger cabin, on the ship. The PBX 202 is connected to a billing system 208 for billing passengers for the use of the wireline phones 204*a-c*. The wireless network 200 is also connected to the billing system 208 to consolidate billing for a customer account. The PBX 202 is adapted to route calls from subscriber units to the wireless communications system 200. In an alternate embodiment, the PBX and switch could be implemented in a single entity as a wireless PBX.

The provisioning of subscriber units for temporary use on the private wireless network will now be described. In one embodiment, passengers have the opportunity to subscribe at the time of booking a cruise, upon boarding the ship and during the cruise itself. Subscriber units, such as mobile phones, may be provided to each subscriber as part of the check-in process for the cruise or sent to the subscriber before the cruise. The subscriber is provided with a mini-subscription on the wireless communications system, and related subscriber information is stored in a billing system to facilitate billing the subscriber for use of the system. The subscriber may also receive a subscriber identity module (SIM) card or user identity module (UIM) card, which is inserted into the subscriber unit to configure the device for use with the wireless communications system in accordance with the subscriber's mini-subscription. In alternative embodiments, the subscriber units are configured before being provided to the subscriber, or through other methods, such as Over-The-Air Service Provisioning (OTASP) for a passenger who arrives with a subscriber unit to allow for remote check-in based on the presence of the subscriber unit within the wireless coverage area.

Figure 9B:
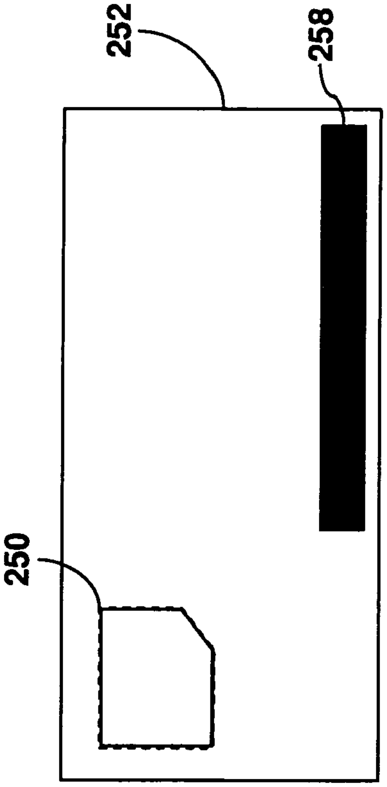
FIGS. 9*a*, 9*b* and 9*c* illustrate a top view, a bottom view and a perspective view, respectively, of an embodiment of a passenger identification card.
Figure 9A:
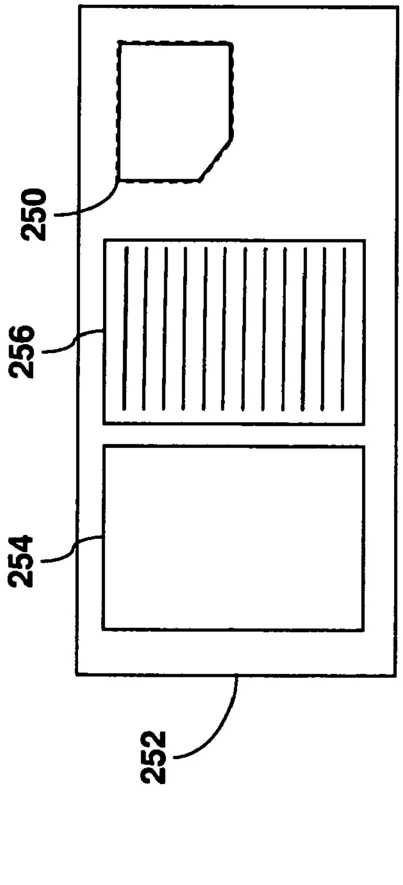
Figure 9C:
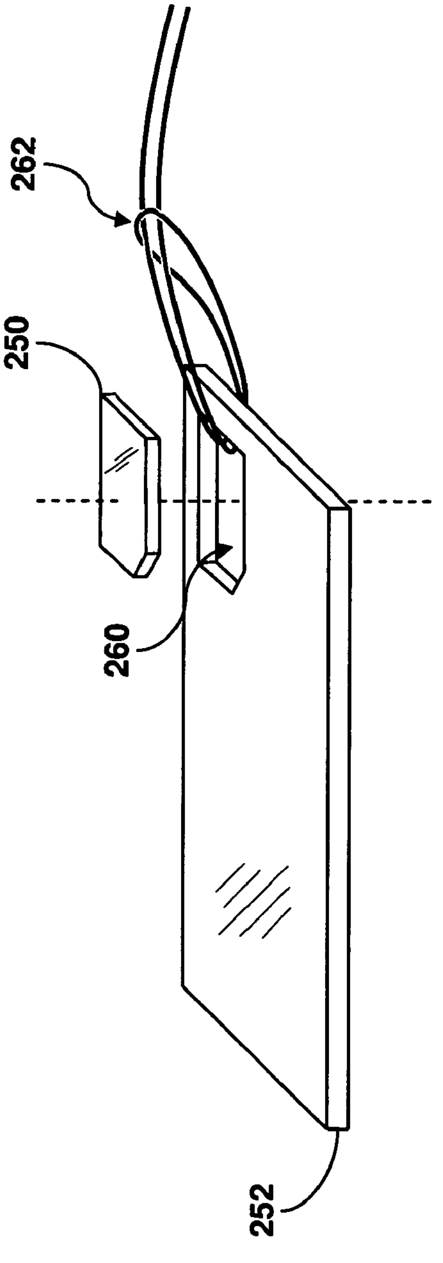

During the check-in process, many cruise ships provide passengers with passenger identification cards for use in identifying an individual passenger, paying for ship services and accessing the passenger's cabin. In one embodiment, the SIM card may be provided to the subscriber as part of the passenger identification card or in place of the passenger identification card. An embodiment of a passenger identification card is illustrated in FIGS. 9*a-c*. A SIM card 250 may be programmed with customer information, including billing account, mobile number, group information and available services. The SIM card 250 is provided to a passenger as part of a passenger identification card 252. The passenger identification card 252 may be used for ship services including use as a room key, use in providing billing information to pay for ship services and use to track passengers as they board and disembark the ship. The passenger identification card 252 may include a passenger photo 254, printed passenger information 256 and stored electronic information, such as on a magnetic strip 258. In this embodiment, the SIM card 250 is removably attached to the passenger identification card 252. When removed, a hole 260 is formed in the passenger identification card 252 allowing the card 252 to be secured to the passenger, such as through a string 262.

The wireless network stores an electronic serial number (ESN) or mobile equipment identifier (MEID) for each provisioned subscriber unit and assigns a mobile identification number (MIN) or international mobile subscriber identity number (IMSI), which may be dialed from other subscriber units or wireline phones to communicate with the subscriber unit. A private numbering plan may be used, such as the use of 4-digit room numbers, to allow passengers quick and easy operation on the cruise ship. In one embodiment, each subscriber unit is assigned a number corresponding to the subscriber's cabin number. The assigned number may also include an occupant number for the corresponding cabin. For example, a family of four in passenger cabin 1022 may be assigned the private numbers 10221, 10222, 10223 and 10224. The phone number 10220 may be reserved for a wireline phone in the cabin, if available. In an alternative embodiment, the MIN may include a unique passenger number, such as the number shown on passenger identification card.

In one embodiment, each subscriber unit is assigned a MIN on an external wireless carrier's network. A phone extension, such as cabin number plus occupant number, may also be associated with the subscriber unit for internal dialing on the ship's private network. When the cruise ends, and the mini-subscription is transferred to the wireless carrier, the subscriber unit maintains the assigned MIN on the wireless carrier's network, allowing the subscriber to continue use of the service. The cruise ship will disassociate the corresponding extension number from the phone and reassign the extension numbers in the next cruise. New MIN's on the wireless carrier network may be provisioned for each cruise and associated with the extension numbers.

As a private network, each subscriber unit is "homed" on the ship, and subscriber information is stored in the HLR. All subscribers have access to the private network and calls between subscribers are handled locally, so there are no roaming charges or intermittent access based on a satellite connection or connection to the PSTN. If the MINs are registered with the wireless carrier, calls from an external communications system, such as a call from a PSTN, may be routed to the ship via the satellite or landline connection, and forwarded to the appropriate subscriber unit based on its MIN. Alternatively, a caller connected to a PSTN may dial an 800 number associated with the cruise ship to reach a manual or automated system via an Interactive Voice Response system or operator. The caller provides passenger identification, such as a ship number and subscriber unit extension, or passenger name to be patched to the ship and routed to the associated subscriber unit.

During provisioning of the subscriber unit, groups may be established for push-to-talk group calling. By default, groups may be established on the SIM/UIM for all subscriber units on the same billing record and all subscriber units in the same cabin. The passengers may also define custom groups. A kiosk on the ship may be provided allowing passengers to edit and manage groups for group calling and to set preferences such as whether to allow or deny communications from certain subscriber units. Other provisioning options may include setting up calling number identification for the subscriber unit and configuring the subscriber unit in accordance with a subscriber's language preference.

Parental controls may also be setup during provisioning. A subscriber unit may be provisioned to each child for limited use authorized by the parent. Limits on use may include limiting calls to certain hours of the day, precluding the child from making external calls, limiting incoming calls by cost, caller ID and other criteria, and configuring the child's subscriber unit to connect to the parent's subscriber unit regardless of the number that is dialed (i.e, hot line dialing).

The ship's private wireless network tracks and bills for subscriber unit communications. Call detail records and records of other wireless transactions, such as text messages sent to, and received by, the subscriber unit, are recorded by the billing system. The billing system converts each billable transaction into a standard charge and determines whether usage limits have been exceeded and an amount to bill the subscriber's account. If billed, the billable transaction and transaction charge is immediately posted to the subscriber's account. At the end of the cruise, the subscriber is billed for the total charges. In alternative embodiments, other billing models may be implemented for use of the private wireless network including separately charging a credit card associated with a subscriber account or debiting a pre-paid balance.

Charges for use of the private wireless network are applied to the subscriber's account in a near-instant manner. In one embodiment, a subscriber may set up alerts to keep the subscriber apprised of the subscriber's billing account status. For example, the subscriber may be notified via SMS message each time a charge is billed to the subscriber's account, allowing the subscriber to track costs and avoid fraudulent charges.

The enterprise system may include one or more wireless applications to facilitate the use of subscriber units for ship-related services. For example, a cruise ship may offer public address broadcast messages through the subscriber units, the subscriber units may be used to request and pay for ship services, and location-based services may be available.

Figure 10:
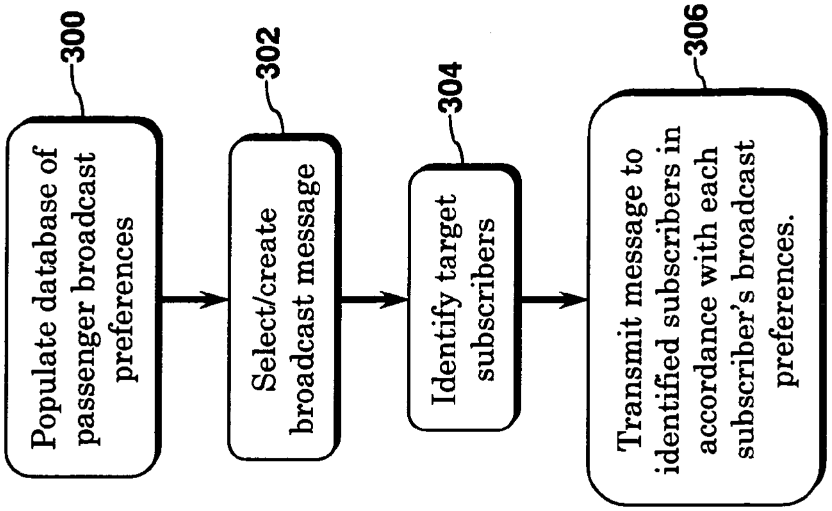
FIG. 10 illustrates an embodiment of a process for transmitting broadcast messages.

The operation of a public address system will now be described with reference to FIG. 10. In step 300, a customer database stores broadcast preferences for each passenger, including a priority level identifying the type of broadcasts to be received (e.g., emergency broadcasts only), a preferred message type (e.g., SMS, email or voice), and a preferred language for the broadcast. In step 302, a broadcast message is created. The message may be selected from a set of predefined messages (e.g., "Please return to the ship. The ship is scheduled to depart in 1 hour.") or a new message may be recorded or created. In step 304 the target passengers are selected from the database. The broadcast message may be directed to a subset of passengers meeting certain characteristics, such as passengers that have set a certain priority level, passengers that are signed up for a particular activity, passengers within a certain location of the ship or passengers that have not returned to the ship from an onshore excursion. The broadcast message could also be directed to subscribers who are hard of hearing or deaf, allowing these subscribers to receive an SMS message of a public address announcement as a mobile alternative to TTY/TDD devices. In step 306, the message type for each customer is determined, and the message is then sent to each customer according to the stored preferences and the corresponding subscription.

An application of a public address broadcast will now be described. As passengers depart and board the ship, they scan their passenger identification cards. This allows the ship to track which passengers are on the ship and which passengers are on shore. In an alternative embodiment, the subscriber units may be used to identify passengers as they depart and board the ship. As the time for departure nears, the ship may transmit a reminder to each missing passenger that the ship will soon be departing. The public address application accesses stored passenger information to identify those passengers who have not returned to the ship. A standard message may be selected and transmitted to each identified customer according to the customer preferences. In one embodiment, standard messages are prepared and stored in a plurality of languages and communications formats supported by the wireless network. For example, a first customer may receive an English SMS message, while a second customer receives a voice message in Spanish.

The broadcast service could also provide subscribers with information about news or events occurring away from the ship in near real time. In one embodiment, the enterprise system periodically downloads current information from an external source, such as from an Internet server via a satellite link or landline data link. Subscribers may sign up to receive certain information via SMS as it becomes available, such as stock quotes, sports scores and breaking news headlines. Subscribers may sign up for the service at a kiosk located on the ship, or sign up for the service from their subscriber units via a web browser or software application.

The subscriber unit may also be used to request and pay for ship services. For example, the subscriber unit may be used as a substitute for the passenger's signature or other passenger verification when placing a room service order. In a call to room service to place a food order, the number of the subscriber unit is automatically provided to the ship's personnel, allowing an associated billing account and cabin number to be identified. After placing the order, the room service personnel may transmit a verification message to the subscriber unit and await a response from the subscriber unit before fulfilling the order. In one embodiment, the room service order and bill are transmitted to the subscriber unit via an SMS message. A reply to the SMS from the subscriber unit serves as a passenger signature to verify the order. Other ship services may be "signed for" in a similar manner. The system may be configured to transmit a payment verification message to a designated subscriber unit for the associated billing account. For example, a child may place a room service order from the child's subscriber device, and the verification message would be sent to a parent's subscriber unit to accept or deny the order.

In another embodiment, the subscriber unit includes an interface allowing the subscriber to view and select service options. The subscriber unit may be programmed with service applications through the SIM card. Service applications may also be available via a subscriber unit web browser which accesses a web server providing web-based wireless applications. For example, the subscriber unit may be programmed with a room service application that includes a room service menu that is viewed on the subscriber unit. Using the subscriber unit's user interface, the subscriber selects desired menu options and submits an order. The application may transmit the order to room service via SMS message or other message type, or via a web application.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. A method for providing wireless services, the method comprising:

provisioning a subscriber unit for use on a first wireless network, the subscriber unit having an associated mini-subscription defining a limited use of the first wireless network, wherein the first wireless network is a home network for the subscriber unit for all calls while the mini-subscription is active on the first wireless network;

terminating the mini-subscription on the first wireless network; and automatically transferring the mini-subscription to a second wireless network and provisioning the subscriber unit for use on the second wireless network in accordance with the mini-subscription, the second wireless network thereafter serving as the home network for all calls for the subscriber unit.

2. The method of claim 1 wherein the subscriber unit is denied access to the first wireless network after the mini-subscription is terminated.

3. The method of claim 1 further comprising billing the subscriber unit for use of the first wireless network in accordance with the mini-subscription.

4. The method of claim 1 further comprising:

receiving, at the second wireless network, the transferred mini-subscription; and automatically provisioning the subscriber unit for limited use on the second wireless network in accordance with the mini-subscription.

5. The method of claim 4 further comprising:

receiving, at the second wireless network, a request to convert the mini-subscription to a full subscription on the second network; and converting the limited subscription to a full subscription on the second wireless network.

6. The method of claim 4 wherein the second wireless network includes a plurality of regional networks, and wherein the subscriber unit is automatically provisioned on one of the regional networks in accordance with the mini-subscription.

7. The method of claim 1 wherein provisioning the subscriber unit for use on the first wireless network comprises:

assigning a mobile station identifier to the subscriber unit, the mobile station identifier being associated with the second wireless network.

8. The method of claim 7 further comprising:

receiving, at the second wireless network, the transferred mini-subscription; and registering the subscriber unit and mobile station identifier with the second wireless network, the second wireless network becoming the home network for the subscriber unit.

9. The method of claim 7 wherein the first wireless network provides wireless services within a coverage area that includes a plurality of rooms, the method further comprising:

assigning an extension number to the subscriber unit, the extension number being associated with one of the plurality of rooms;

registering the extension number with the first wireless network;

receiving an incoming communication directed to the extension number; and routing the incoming communication to the subscriber unit.

10. A private communications system comprising:

a base station providing a radio link between the private communications system and a subscriber unit, the subscriber unit having an associated mini-subscription authorizing temporary access to the private communications system, the private communications system serving as the home network of the subscriber unit for all calls while the mini-subscription is active on the private communications system;

a switch connected to the base station, the switch providing the subscriber unit with access to the private communications system when the mini-subscription is active, and denying access to the private communications system after the mini-subscription terminates; and an interface between the switch and an external wireless network, wherein the mini-subscription information is automatically transmitted to the external wireless network when the mini-subscription is terminated to establish the external wireless network as the home network for all calls for the subscriber unit thereafter.

11. The private communications system of claim 10 further comprising a Home Location Register (HLR) connected to the switch, the HLR adapted to establish the private communications system as a home network for the subscriber unit when the mini-subscription is active.

12. The private communications system of claim 11 wherein the HLR is further adapted to store a unique mobile identification number and a first extension number associated with the subscriber unit, and wherein the switch routes incoming communications directed to either the mobile identification number or the first extension number to the subscriber unit.

13. The private communications system of claim 12 further comprising:

a private branch exchange (PBX) interfaced with the switch; and a wireline device connected to the PBX and having an associated second extension number, the PBX and switch facilitating communications between the wireline device and the subscriber unit in accordance with the associated first and second extension numbers.

14. The private communications system of claim 12 further comprising a memory card storing the mobile identification number, the first extension number and configuration information associated with the subscriber unit, the memory card being insertable into the subscriber unit enabling the subscriber unit to access the private communications system.

15. The private communications system of claim 12 wherein after the mini-subscription terminates, the first extension number is re-assignable to another subscriber unit and wherein the mobile identification number is not re-assignable by the private communications system to another subscriber unit.

16. The private communications system of claim 10 wherein the switch selectively routes communication traffic between the subscriber unit and a public network through either a wireline connection or a satellite link, according to an anticipated cost of the communication.

17. The private communications system of claim 10 wherein the base station is mounted on a vessel and has a variable geographic coverage area that selectively extends to a region adjacent to the vessel, depending on a location of the vessel.

18. The private communications system of claim 17 wherein the base station is adapted to communicate with the subscriber unit using at least a first frequency band and a second frequency band, and wherein the first frequency band or second frequency band is selected in accordance with vessel location information including at least one of a current location, a destination location and a route between the current location and the destination location.

19. The private communications system of claim 10 further comprising a plurality of antennas and a base station controller, wherein the base station controller performs handoff functions between respective ones of the plurality of antennas, and tracks a location of the subscriber unit in the private communications system.

20. On a vessel including a plurality of passenger cabins, a method of operating a wireless communications system, the method comprising:

provisioning a subscriber unit on the wireless communications system, the subscriber unit having a mobile station identifier and an extension associated with a passenger cabin, wherein the wireless communications system serves as the subscriber unit's home network for all calls in accordance with a corresponding mini-subscription;

receiving at a mobile switching center an incoming communication directed to the passenger cabin;

establishing a wireless communication link between the subscriber unit and the mobile switching center;

when the mini-subscription expires, terminating the mini-subscription including disassociating the extension number from the subscriber unit; and transmitting the mini-subscription to an external wireless carrier which serves at the subscriber unit's home network for all calls thereafter, the subscriber unit identified on the external wireless carrier by the mobile station identifier.

21. The method of claim 17 further comprising provisioning a second subscriber unit, the second subscriber unit having a second mobile station identifier and the extension associated with the passenger cabin.

* * * * *